(12) United States Patent
Himberger et al.

(10) Patent No.: US 7,237,118 B2
(45) Date of Patent: Jun. 26, 2007

(54) METHODS AND SYSTEMS FOR AUTHENTICATION OF A USER FOR SUB-LOCATIONS OF A NETWORK LOCATION

(75) Inventors: Andrew M. Himberger, Redmond, WA (US); Chris Pearo, Seattle, WA (US); Lucas J. Forschler, Kirkland, WA (US); Stillman T. Saunders, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 816 days.

(21) Appl. No.: 10/310,269

(22) Filed: Dec. 5, 2002

(65) Prior Publication Data
US 2004/0111621 A1 Jun. 10, 2004

(51) Int. Cl.
*H04K 1/00* (2006.01)
*H04L 9/00* (2006.01)
*G06F 15/16* (2006.01)

(52) U.S. Cl. .............. 713/182; 709/227; 709/228; 709/229

(58) Field of Classification Search ........... 713/182; 709/227–229
See application file for complete search history.

(56) References Cited

U.S. PATENT DOCUMENTS

| | | | |
|---|---|---|---|
| 6,226,752 B1* | 5/2001 | Gupta et al. ............. | 726/9 |
| 2002/0004784 A1* | 1/2002 | Forbes et al. ............. | 705/51 |
| 2002/0129159 A1* | 9/2002 | Luby et al. ............... | 709/236 |
| 2003/0018707 A1* | 1/2003 | Flocken .................... | 709/203 |

* cited by examiner

*Primary Examiner*—Kambiz Zand
*Assistant Examiner*—Jason K. Gee
(74) *Attorney, Agent, or Firm*—Merchant & Gould P.C.; Ryan T. Grace (57) ABSTRACT

Methods and systems authenticate a user of a sub-location of a network location by using a first cookie for authentication within the network location, such as a domain of the world wide web, and also use a second cookie for authentication within a sub-location of the network location. When the user attempts to visit a network location or sub-location within the network location, the server of the network location authenticates the user by obtaining a previously stored cookie from the user's computer and validating it for the network location. Upon being authenticated by the validation, a cookie for a sub-location within the network location is generated for the user and provided to the user's computer. When the user attempts to access the sub-location within the network location, the cookie provided to the user's computer for the sub-location is obtained and validated to authenticate the user for the sub-location.

40 Claims, 4 Drawing Sheets

METHODS AND SYSTEMS FOR AUTHENTICATION OF A USER FOR SUB-LOCATIONS OF A NETWORK LOCATION

TECHNICAL FIELD

The present invention is related to authenticating a user for access to a network resource. More particularly, the present invention is related to authenticating a user for one or more individual sub-locations of a network location.

BACKGROUND

Computer networks allow resources to be shared among different computers. For example, the Internet allows computers around the world to exchange information such as electronic mail. The world wide web provides for the exchange of audio-visual information between computers connected to the Internet. Furthermore, centralized computer servers may store information posted by one computer user for access by others.

Server computers allow computer users to access information stored within various sub-locations of a network location such as an Internet domain. Sub-locations of a network location may include individual directories of one or more servers or individual servers of a server farm. A particular sub-location may be allocated to a particular computer user or group of users who post information to the sub-location for access by other computer users also connected to the network location. Although such information sharing through the network is beneficial to computer users, care must be exercised in the administration of the network to prevent unauthorized access to the various network locations and sub-locations of the network locations.

To prevent unauthorized access, the user is authenticated for the network location. Authentication of a user can be performed in various ways. One method is to require the user to enter a user name and password before access to the network location and corresponding sub-locations is permitted. However, as the number of network locations a user may wish to access increases, requiring the user to enter a user name and password for every location becomes cumbersome.

To address this issue, a cookie is issued to the user upon the user entering a user name and password once so that the cookie can be used to authenticate the identity of the user at the network location, such as a domain within the world wide web, for all of the sub-locations within the network location. The cookie is a data file that serves to identify the user by including one or more lengthy numbers that are an identification of the user and that typically expires at a certain future time. The initial login with a user name and password is typically done through a trusted central network location maintaining the reference username and password, such as .NET™ Passport™ for example. When the user attempts to visit a network location, the user's computer is directed to the trusted network location which issues an encrypted cookie to the user's computer for the network location. Then, the user's computer is directed back to the server of the network location, and this server then check the cookie that has just been issued to the user's computer.

The server requests the cookie from the user's computer and then attempts to validate the cookie by decrypting the cookie with a secret key and determining that the decrypted cookie has not expired. Upon the server of the visited network location successfully validating the cookie, the visited network location has authenticated the user attempting access because the validated cookie confirms that the user attempting to access the network location is a user of a known and trusted identity. The identity may be specified by information contained within the decrypted cookie.

For sub-locations of network locations where users can post information, a security risk still exists where cookies are being used to authenticate the user for the visited network location. A user having access to a sub-location within the visited network location may post scripting information for various reasons such as to provide audio-visual information to others accessing the sub-location. However, a malicious user may post scripts that perform malicious activities such as stealing cookies that are uploaded from other users' computers when they are visiting the network location.

Upon obtaining the cookies of the other users visiting the network location, the malicious user who stole these cookies can then impersonate these other users to gain access to sub-locations within the network location for which the impersonated user has access. Thus, the malicious user who stole the cookies can now be given access to sub-locations and activities that this malicious user might not otherwise be able to access, such as activities and/or sub-locations that involve personal, financial, or other sensitive information about the users being impersonated.

SUMMARY

Embodiments of the present invention address these and other issues by providing a cookie for authentication of a user for a specific sub-location of the network location in addition to using the cookie that authenticates the user for the network location that provides the sub-location. When a user logs in to a network location and sub-location, only the cookie for the network location and the cookie for the individual sub-location are exposed within the sub-location being visited. If these two cookies are stolen by a malicious user who posted malicious script within the sub-location, then the malicious user who stole the cookies can only impersonate the user for the same sub-location where the user who stole the cookies has previously had access to. The malicious user who stole the cookies will not be able to impersonate the user for other sub-locations that require a different cookie specific to a sub-location.

One embodiment is a method of authenticating a user of a computer for a sub-location of a network address. The method involves providing a first cookie to the computer for user authentication for the network address and providing a second cookie to the computer for user authentication for a first sub-location of the network address. When the computer attempts to access the network address, the first cookie is validated to authenticate the user for the network address. The second cookie is validated to authenticate the user for the first sub-location of the network address.

Another embodiment is a computer system that includes a network interface and a processing device. The processing device is configured to obtain a first cookie through the network interface and validate the first cookie to authenticate a user for the network address. The processing device is also configured to obtain a second cookie through the network interface and validate the second cookie to authenticate the user for the first sub-location of the network address.

Another embodiment is a network system that includes a server computer at a network address that provides at least one sub-location of the network address. A client computer is in communication with the server computer over a network, and the client computer stores a first cookie for the network address and a second cookie for the sub-location of the network address. The server computer accesses and validates the first to authenticate a user of the client computer for the network address, and the server computer accesses and validates the second cookie to authenticate the user of the client computer for a sub-location of the network address.

Another embodiment is a computer readable medium comprising instructions that when executed by a computer perform various steps. A first cookie is obtained through a network interface of the computer and is validated to authenticate a user for a network address. A second cookie is obtained through the network interface of the computer and is validated to authenticate the user for a first sub-location of the network address.

DETAILED DESCRIPTION

Embodiments of the present invention provide sub-location cookies, such as directory cookies as shown and discussed in the FIGS. 1–4, for various sub-locations of a network location. An example of a network location is a domain identified in a URL or an IP address. The sub-location cookies are provided so that users are authenticated for the sub-locations in addition to being authenticated for the network location hosting the sub-locations. Thus, a user who steals a cookie allowing false authentication for a network location is still required to be authenticated for a sub-location within the network location with a different cookie.

Figure 1:
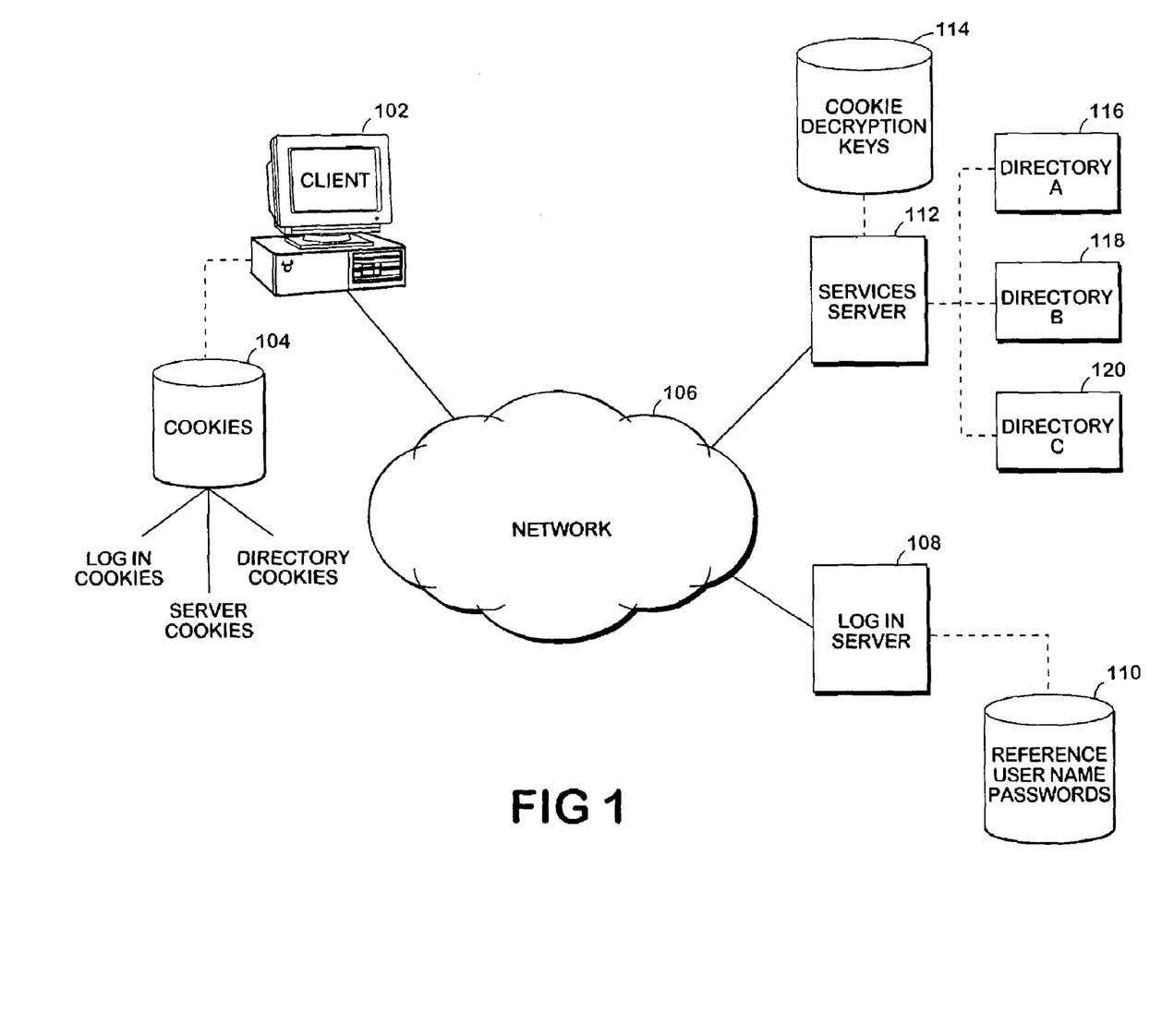
FIG. 1 illustrates a networked operating environment for embodiments of the present invention.

FIG. 1 shows a typical network operating environment where embodiments of the present invention may be implemented. A client computer 102 is linked to a network 106, such as a local area network, wide area network, or the global Internet. The client computer 102 can communicate with various server computers also linked to the network 106. For example, a log in server 108 linked to the network allows the user to log in with a user name such as an email address and a password to obtain a first server cookie that allows the user to be authenticated at a network location without requiring the user to enter the user name and password again for that network location. Furthermore, the log in server 108 may issue a log in cookie to the user of the client computer such that upon the user attempting to visit a network location and being redirected to the log in server 108 for authentication, the log in cookie is obtained to authenticate the user for the log in server 108 without requiring another entry of the username and password.

The log in server 108 may access a store 110 of reference user names and passwords. Upon the user of the client computer 102 first visiting the log in server 108 and entering a user name and password, the log in server 108 may look up the user name in the store 110 and compare the entered password to the stored password. When they match, the user of the client computer 102 has been authenticated as the user owning the user name and the log in cookie is provided to the client computer 102 from the log in server 108 and a server cookie may be provided when the client computer has been directed to the log in server as a result of attempting to visit a services server 112. The log in cookie and server cookie may include an identifier value corresponding to the owner of the user name who logged in to obtain the cookies. Furthermore, these cookies may be encrypted with a secret key and/or may have an expiration time. The client computer 102 saves the cookies in a store 104 such that when the client computer 102 attempts to access a corresponding network location, the server cookie in the store 104 can be obtained by a server at the network location to authenticate the user by validating the server cookie in one of various ways. Validation may include attempting to decrypt the server cookie with a secret key and/or verifying that the server cookie has not expired based on its expiration date. Additionally, if and when the client computer 102 is redirected to the log in server 108, the log in cookie may be obtained by the log in server 108 to authenticate the user of the client computer 102 once again without requiring reentry of the username and password.

A services server 112 is linked to the network 106 and provides services to client computers 102, including providing access to various sub-locations, such as directories 116, 118, and 120 of the network location established by the server 112, or such as individual servers of a server farm at the network location. The individual directories 116, 118, and 120 or individual servers of a server farm may provide various pieces of information useful to the client computer 102 such as documents and access to personal or otherwise sensitive information. For example, upon a user being authenticated for a sub-location, the user may be able to make on-line purchases through the sub-location where the billing information for the authenticated user is stored and is applied by the sub-location without the user re-entering the information when the user makes the purchase.

To prevent unauthorized access to the network location that is provided by the services server 112, the server 112 authenticates a user attempting to access a particular sub-location or other service provided by the server 112 by obtaining the server cookie from the client computer 102 that is attempting to access the server 112. The server 112 validates the server cookie as described above by attempting decryption with a special key in storage 114 and/or verifying that the server cookie has not expired. Where access to the network location requires authorization in addition to the initial authentication, identifier information of the cookie may be compared to identifier information maintained in the storage 114.

When the client computer 102 accesses the network location of the services server 112, if the user of the client computer 102 has not yet obtained the server cookie for the network location then the client computer 102 is directed to the log in server 108. After being authenticated, the client computer 102 is redirected to the services server 112 with the server cookie and with a message within the query string from the log in server 108 to the services server 112. This message indicates that the user has just been authenticated at the log in server 108 which indicates that the user has not stolen the server cookie but has obtained it legitimately. Upon the services server 112 receiving the message and authenticating the user through validation of the server cookie just received, the services server 112 then generates sub-location cookies for the authenticated user for one or more of the sub-locations that require authentication.

The sub-location cookies are provided from the services server 112 to the client computer 102 of the user where they are saved in the storage 104 such as a mass storage device. The sub-location cookies may be encrypted and/or may have an expiration value such that the service server 112 may decrypt the sub-location cookies with another secret key in the storage 114 and/or may check for expiration to validate the cookie. In certain embodiments where authorization is to be determined for the sub-locations for an authenticated user, identifier information for the user may also be included in these sub-location cookies and a matching identifier is saved in the store 114 of the service server 112 in association with authorization for one or more of the various sub-locations. If the user is not able to be authenticated upon accessing the network location because the user does not have the server cookie, then the services server 112 may redirect the client computer 102 to the log in server 108 as discussed above or may simply deny access to the client computer 102.

When the user of the client computer 102 attempts to access a particular sub-location within the network location of the services server 112 after being authenticated through validation of the server cookie, the services server 112 obtains the corresponding sub-location cookie from the client computer 102. The service server 112 attempts to validate the sub-location cookie, such as by decryption and/or checking the expiration date, to authenticate the user of the client computer 102 for the sub-location being accessed. The sub-location cookie may contain an identifier of the sub-location that the sub-location cookie applies to and may also include various other pieces of information, including the identifier also used in the server cookie for the user. For embodiments where user identification information is included, the sub-location cookie may include a different identifier associated with the user by the services server 112 than the identifier of the user included in the server cookie.

If someone steals the server cookie of a user after the user has accessed the network location, the stolen server cookie will not provide authentication required for access to the sub-locations of the network location requiring sub-location cookies. If the legitimate user is authenticated for a sub-location with a sub-location cookie obtained from the user's computer 102 and someone steals the sub-location cookie while the user is visiting the sub-location, then the stolen sub-location cookie will not provide authentication required for access to other sub-locations of the network location. The stolen sub-location cookie will only allow authentication for the sub-location that the cookie thief already has access to.

Figure 2:
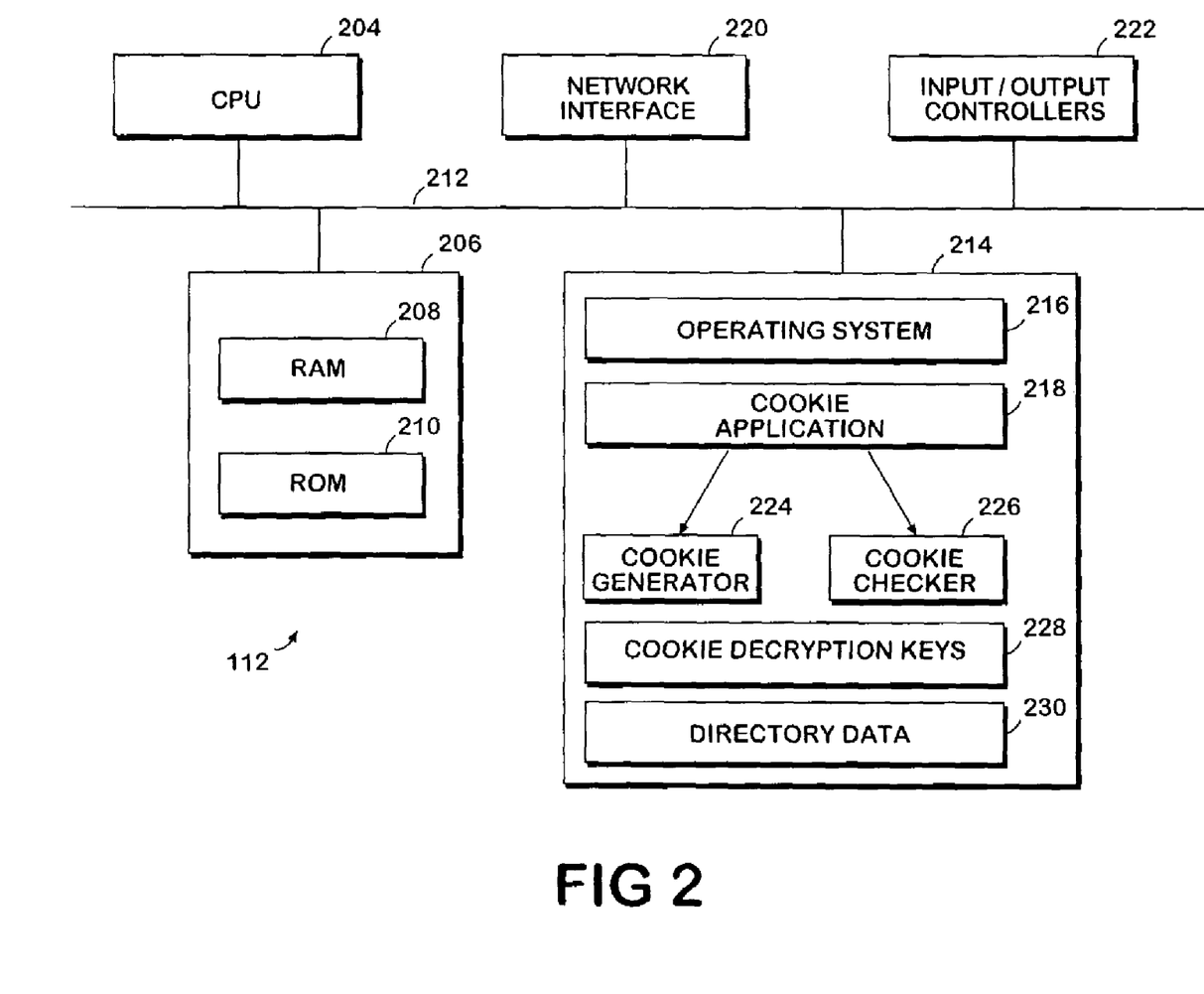
FIG. 2 illustrates the components of a server computer of a network location according to an embodiment of the present invention.

FIG. 2 and the following discussion are intended to provide a brief, general description of a suitable computing environment in which the invention may be implemented in the services server computer 112. While the invention will be described in the general context of program modules that execute in conjunction with application programs that run on an operating system on a server computer, those skilled in the art will recognize that the invention may also be implemented in combination with other program modules. Generally, program modules include routines, programs, components, data structures, and other types of structures that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention as applied to the server computer 112 of FIG. 1 may also be practiced in distributed computing environments where tasks are performed by remote processing devices that are linked through a communications network rather than in a single computer. In a distributed computing environment, program modules may be located in both local and remote memory storage devices.

FIG. 2 shows an illustrative computer architecture for the server computer 112 for practicing the various embodiments of the invention. The computer architecture shown in FIG. 2 illustrates a conventional server computer, including a central processing unit 204 ("CPU"), a system memory 206, including a random access memory 208 ("RAM") and a read-only memory ("ROM") 210, and a system bus 212 that couples the memory to the CPU 204. A basic input/output system containing the basic routines that help to transfer information between elements within the computer, such as during startup, is stored in the ROM 210. The server computer 112 further includes a mass storage device 214 for storing an operating system 216 and application programs, such as the cookie application program 218 that performs the log in and sub-location cookie authentication functions. The mass storage device 214 also stores two components of the cookie application program 218 that includes a cookie generator 224 for generating sub-location cookies and a cookie checker 226 that validates the log in and sub-location cookies from the user's computer. The validation may utilize cookie decryption key information 228 in mass storage 214 and/or checks of the expiration values of the cookies to authenticate the user. The mass storage 214 may also include sub-location data 230 for the various sub-locations provided at the network location.

The mass storage device 214 is connected to the CPU 204 through a mass storage controller (not shown) connected to the bus 212. The mass storage device 214 and its associated computer-readable media, provide non-volatile storage for the server computer 112. Although the description of computer-readable media contained herein refers to a mass storage device, such as a hard disk or CD-ROM drive, it should be appreciated by those skilled in the art that computer-readable media can be any available media that can be accessed by the server computer 112.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media. Computer-readable media may also be referred to as computer program product.

According to various embodiments of the invention, the server computer 112 may operate in a networked environment using logical connections to remote computers through the network 106, such as the Internet. The server computer 112 may connect to the network 106 through a network interface unit 220 connected to the bus 212. It should be appreciated that the network interface unit 220 may also be utilized to connect to other types of networks and remote computer systems. The server computer 112 may also include an input/output controller 222 for receiving and processing input from a number of devices, including a keyboard or mouse (not shown). Similarly, an input/output controller 222 may provide output to a display screen, a printer, or other type of output device.

As mentioned briefly above, a number of program modules and data files may be stored in the mass storage device 214 and RAM 208 of the server computer 112, including an operating system 216 suitable for controlling the operation of the networked server computer 112. The mass storage device 214 and RAM 208 may also store one or more application programs such as the cookie application 218 and corresponding components including the cookie generator 224, cookie checker 226, and cookie decryption key information 228.

Figure 3:
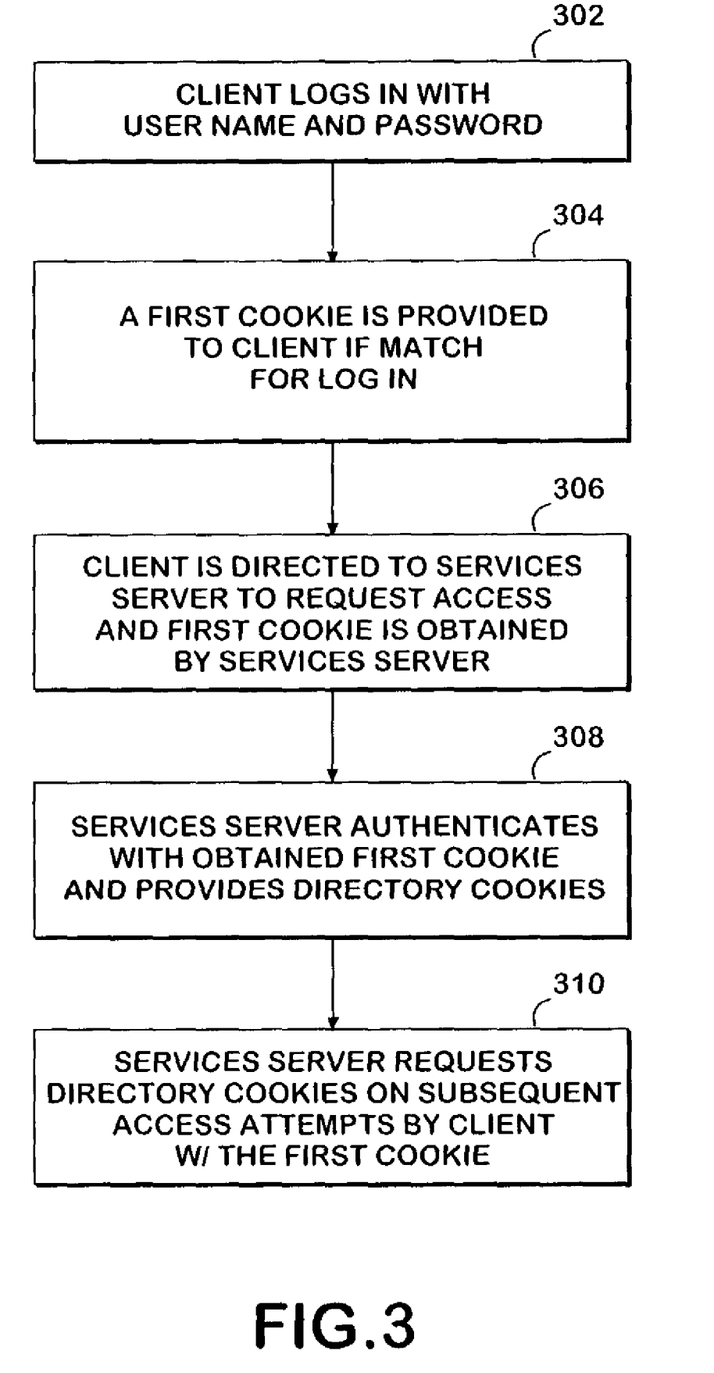
FIG. 3 illustrates the logical operations of the interaction that occurs within the network of FIG. 1 between the log in server, services server, and the client computer to authenticate the user of the client computer according to one embodiment of the present invention.
Figure 4:
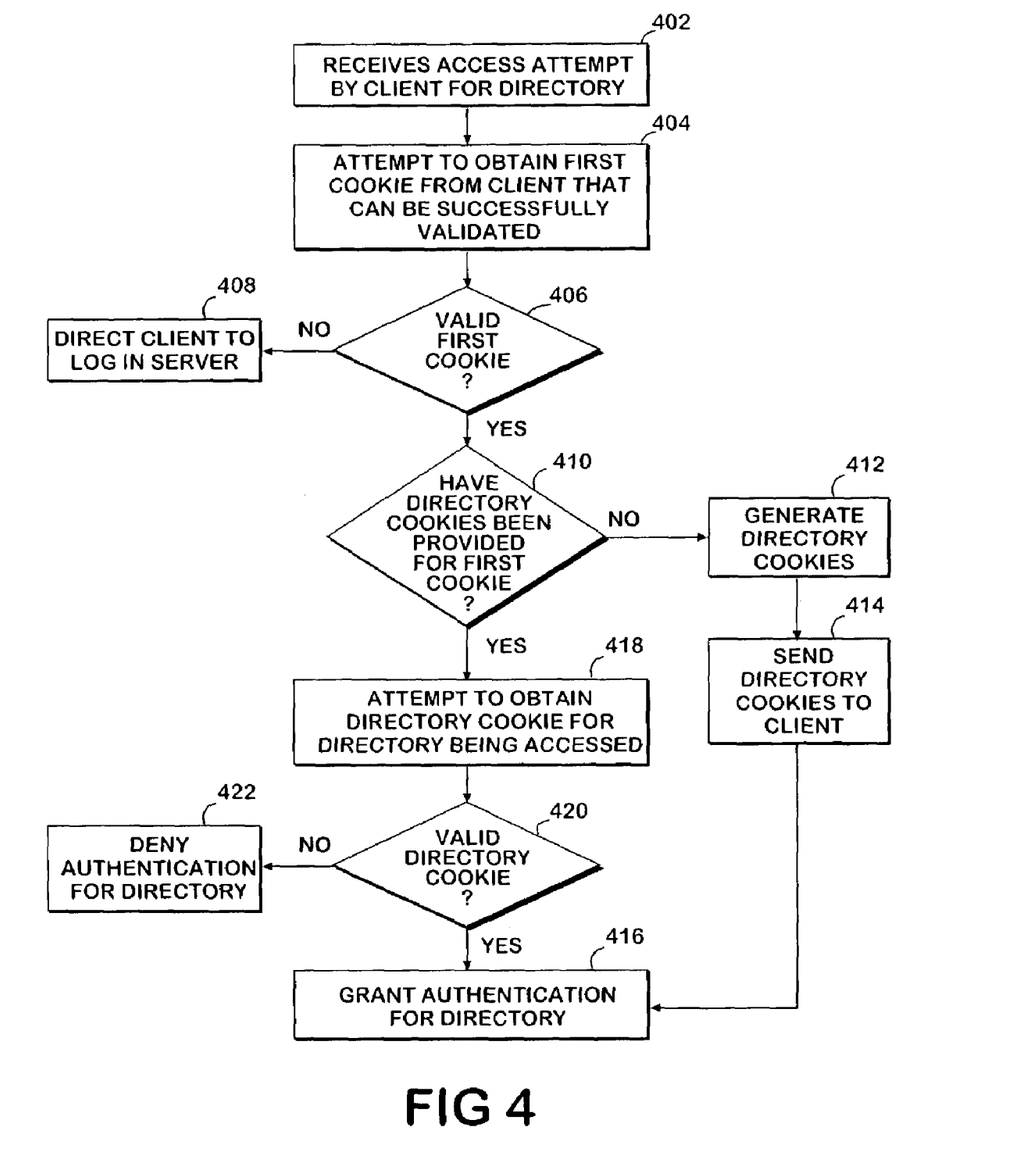
FIG. 4 illustrates the logical operations performed by the services server to authenticate the user of the client computer for one or more sub-locations according to one embodiment of the present invention.

Embodiments of the present invention provide program modules for use in conjunction with the cookie application program 218. The program modules implement logical operations to authenticate users attempting to access various sub-locations of the network location. Various embodiments of the logical operations of the program modules for the cookie application program 218 are discussed below with reference to FIGS. 3 and 4. FIG. 3 shows the logical operations implemented within the network environment of FIG. 1 where the client computer 102, log in server 108, and services server 112 interact to authenticate the user of the client computer 102 for a sub-location of the network location of the service server 112. FIG. 4 shows the logical operations implemented within the cookie application 218 to generate and check sub-location cookies for authentication of the user.

The illustrative logical operations of FIG. 3 for one embodiment begin at log in operation 302 where the client computer 102 logs in at the log in server 108 by entering a user name and password, such as after being redirected from the services server 112 that the user is attempting to visit. The log in server 108 compares the user name and password to a reference user name and password for the user. Upon a successful comparison indicating a match for the log in credentials, the log in server 108 provides a server cookie (first cookie) to the client computer 102. As discussed above, this server cookie may include an expiration value and/or may be encrypted with a key known the services server 112 so that the server cookie can be validated. As also discussed above, the log in server 108 may also provide a log in cookie that authenticates the user for the log in server 108 if the user is redirected to the log in server 108 in the future.

After the client computer 102 has logged in to obtain the server cookie, the client computer 102 attempts to access the network location of the services server 112 at access operation 306 upon being directed back to the services server 112 from the log in server 108. Upon the redirection, the query string includes the message from the log in server 108 indicating that the user of the client computer 102 having the server cookie has just been authenticated. At this time, the services server 112 obtains message from the query string and the server cookie from the client computer 102 and attempts to validate the server cookie. The services server 112 authenticates the user at authentication operation 308 upon validating the server cookie such as by decrypting it and/or verifying that it has not expired. Upon authentication, the services server 112 generates and provides the sub-location cookies to the user for each of the sub-locations provided at the services server 112 since the services server 112 received the message from the log in server 108 that the user has just been authenticated at the log in server 108.

Once the sub-location cookies have been provided to the client computer 102 for a particular server cookie, the services server 112 requires that the client computer 102 being authenticated with this same server cookie have the issued sub-location cookie for the sub-location that the user is attempting to access. This allows the services server 112 to attempt validation of the sub-location cookie, through decryption with another secret key and/or through verification of non-expiration, to authenticate the user for the sub-location being accessed at sub-location operation 310. If the user with the server cookie does not have the sub-location cookies, then the services server 112 may direct the user to be authenticated again with the log in server 108.

It will be appreciated that in certain embodiments, the services server 112 may also provide additional authorization checking once a user has been authenticated to determine whether the authenticated user has authorization to access a particular sub-location. Although the sub-location cookies serve to authenticate the user for sub-locations at the network location, the user may not have authorization for certain sub-locations and may be denied access on that basis.

FIG. 4 shows the illustrative logical operations of one embodiment of the cookie application 218 for authenticating a user. The logical operations begin at access operation 402 where the services server 112 receives an access attempt from the client computer 102, where the access attempt may be a redirection from the log in server 108 back to the services server 112. Upon receiving the access attempt, the services server 112 attempts to obtain the server cookie (first cookie) from the client computer 102 that can be validated through decryption and/or verification of non-expiration. At this time, the services server 112 may also obtain any message from the log in server 108 that indicates that the user has just been authenticated at the log in server 108.

Query operation 406 detects whether the server cookie has been successfully validated. If query operation 406 detects that no validation of the server cookie has occurred, such as because the server cookie cannot be decrypted or has expired, then the services server 112 may direct the client computer 102 to the log in server 108 at redirect operation 408. Alternatively, the services server 112 may simply deny access to the user. If query operation 406 detects that a server cookie has been successfully validated, then operational flow transitions to query operation 410.

At query operation 410, the services server 112 tests whether sub-location cookies have already been provided to a client computer 102 for the currently obtained server cookie. This may be performed by referring the to message in the query string returned to the services server 112 from the log in server 108. If the message from the log in server 108 has been received, then the services server 112 knows that the user has just been authenticated at the log in server 108 for the network location of the services server 112 and that the directory cookies have not been provided yet. This message further indicates that the user presenting the server cookie is the legitimate user rather than a malicious user who may have stolen the server cookie. Had the message from the log in server 108 not been present, then the services server 112 proceeds as if the sub-location cookies have already been provided for this server cookie, which prevents the sub-location cookies from being issued to a malicious user.

When query operation 410 detects that the sub-location cookies have not been previously provided for this server cookie because the message within the query string from the log in server 108 is present, then the services server 112 generates the sub-location cookies to be used in association with the current server cookie at generation operation 412. As discussed, each of these generated sub-location cookies includes an identifier of the corresponding sub-location and may also include an identifier of the user where additional authorization checks are required for access. These generated sub-location cookies are then sent to the client computer 102 at send operation 414. Authentication for the current user for the sub-location being accessed is then granted at authentication operation 416.

When query operation 410 detects that the sub-location cookies have already been previously provided for this server cookie due to no message being received from the log in server 108 for the access attempt, then the services server 112 attempts to obtain the sub-location cookie for the sub-location currently being accessed at cookie operation 418. As discussed above for the server cookie, the sub-location cookies of the client computer 102 may be encrypted with a key known to the services server 112 such that the key is used to decrypt the sub-location cookie so that it can be validated. Additionally, the relevant sub-location is identified in the sub-location cookie. Query operation 420 then detects whether a sub-location cookie for the current sub-location has been validated by decryption and/or verification of non-expiration and also by comparison of the sub-location identified in the cookie to the sub-location being accessed.

When query operation 420 detects that no sub-location cookie that can be validated for this sub-location has been found, then the services server 112 denies authentication for the sub-location to the user at rejection operation 422 such that the current user will not be able to access this sub-location. This prevents a malicious user who may have stolen the server cookie and possibly even a directory cookie to another sub-location from accessing the current sub-location. When query operation 420 detects that a sub-location cookie has been validated for this sub-location, then the services server 112 grants authentication for the sub-location to the user at authentication operation 416. If necessary, the authenticated user can then be referenced against authorization rules for the sub-location to determine whether this authenticated user has permission to access this sub-location of interest.

While the invention has been particularly shown and described with reference to illustrative embodiments thereof, it will be understood by those skilled in the art that various other changes in the form and details may be made therein without departing from the spirit and scope of the invention.

What is claimed is:

1. A method of authenticating a user of a computer for at least one sub-location of a network address, comprising
   providing a network address having a sub-location, wherein the network address is a domain that requires at least two cookies to provide user authentication to access the sub-location;
   providing a first cookie to the computer for user authentication for the network address, wherein the first cookie provides user authentication for the network address and does not provide authentication for the sub-location;
   providing a second cookie to the computer for user authentication for a first sub-location of the network address;
   when the computer attempts to access the network address, validating the first cookie to authenticate the user for the network address; and
   validating the second cookie to authenticate the user for the first sub-location of the network address.

2. The method of claim 1, wherein the second cookie is validated when the computer attempts to access the first sub-location of the network address.

3. The method of claim 1, wherein the network address is a domain of the world wide web.

4. The method of claim 1, wherein the second cookie is encrypted with a key known to a server hosting the network address and the sub-location within the network address.

5. The method of claim 1, wherein the second cookie specifies a user identifier and an identifier of the first sub-location of the network address.

6. The method of claim 1, wherein the second cookie includes an expiration value.

7. The method of claim 1, further comprising:
   providing an additional cookie to the computer for user authentication for an additional sub-location of the network address; and
   validating the additional cookie to authenticate the user for the additional sub-location of the network address.

8. The method of claim 1, further comprising:
   searching for an additional cookie tat can be validated for an additional sub-location of the network address; and
   denying authentication of the user for the additional sub-location of the network address when the additional cookie is not found.

9. The method of claim 1, further comprising:
   obtaining a user name and password from the user computer;
   comparing the user name and password to a reference user name and password;
   providing the first cookie when the user name and password match the reference user name and password;
   when the user attempts to access the network location for the first time after the user computer receives the first cookie, providing the second cookie to the user computer upon validating the first cookie; and
   when the user attempts to access the network location after the first time with the first cookie, then obtaining the second cookie from the computer.

10. The method of claim 9, wherein comparing the user name and password to the reference user name and password occurs at a second network location, and wherein the first cookie is provided to the user computer from the second network location.

11. A computer system, comprising:
a network interface; and
a processing device configured to:
  obtain a first cookie through the network interface and validate the first cookie to authenticate a user for the a network address, wherein the network address is a domain wherein the first cookie provides user authentication for the network address and does not provide user authentication for the sub-locations of the network address;
  obtain a second cookie through the network interface and validate the second cookie to authenticate the user for a first sub-location of the sub-locations of the network address.

12. The computer system of claim 11, wherein the processing device validates the second cookie upon receiving an attempt to access the first sub-Location of the network address.

13. The computer system of claim 11, wherein the network address is a domain of the world wide web.

14. The computer system of claim 11, further comprising storage that contains a key that decrypts the second cookie.

15. The computer system of claim 11, wherein the second cookie specifies a user identifier and an identifier of the first sub-location of the network address.

16. The computer system of claim 11, wherein the second cookie includes an expiration value.

17. The computer system of claim 11, wherein the processing device is further configured to obtain an additional cookie for an additional sub-location of the network address through the network interface and to validate the additional cookie to authenticate the user for the additional sub-location of the network address.

18. The computer system of claim 11, wherein the processing device is further configured to search through the network interface for an additional cookie that can be validated for an additional sub-location and deny authentication of the user for the additional sub-location of the network address when the additional cookie is not found.

19. The computer system of claim 11, wherein the processing device is further configured to:
  provide the second cookie through the network interface upon validating the first cookie when the first cookie is obtained through the network interface for the first time; and
  obtain the second cookie through the network interface when the first cookie is obtained through the network interface after the first time.

20. The computer system of claim 11, wherein the sub-location is a directory of a server at the network address.

21. A network system, comprising:
a server computer at a network address providing at least one sub-location of the network address, wherein the network address is a domain, wherein the network address requires at least two separate cookies to provide user authentication for access to resources of the network location; and
a client computer in communication with the server computer over a network, the client computer storing a first cookie for the network address and a second cookie for the sub-location of the network address, and wherein the server computer accesses and validates the first cookie to authenticate a user of the client computer for the network address and wherein the server computer accesses and validates the second cookie to authenticate the user of the client computer for a sub-location of the network address.

22. The network system of claim 21, wherein the server computer validates the second cookie when the client computer attempts to access the first sub-location of the network address.

23. The network system of claim 21, wherein the network address is a domain of the world wide web.

24. The network system of claim 21, wherein die second cookie is encrypted with a key known to the server computer.

25. The network system of claim 21, wherein the second cookie specifies a user identifier and an identifier of the first sub-location of the network address.

26. The network system of claim 21, wherein the second cookie includes an expiration value.

27. The network system of claim 21, wherein the client computer stores an additional cookie for user authentication for an additional sub-location of the network address and wherein the server computer accesses and validates the additional cookie to authenticate the user for the additional sub-location of the network address.

28. The network system of claim 21, wherein the server computer searches for an additional cookie from the client computer that can be validated for an additional sub-location of the network address and denies authentication of the user for the additional sub-location when the additional cookie is not found.

29. The network system of claim 21, further comprising a second server computer that obtains a user name and password from the client computer, compares the user name and password to a reference user name and password, and provides the first cookie to the client computer when the user name and password match the reference user name and password.

30. The network system of claim 21, wherein the server computer, upon the client computer attempting to access the network location for the first time after the client computer receives the first cookie, then provides the second cookie to the client computer upon validating the first cookie, and wherein the server computer, upon the client computer attempting to access the network location after the first time, then obtains the second cookie from the client computer.

31. A computer readable medium comprising instructions that when executed by a computer perform the steps of:
  providing a network address having at least one sub-location, wherein the network address is a domain, wherein the network address requires at least two cookies to provide user authentication to access the sub-location;
  obtaining a first cookie through a network interface of the computer;
  validating the first cookie to authenticate a user for a network address, wherein the first cookie does not provide user authentication to access a first sub-location;
  obtaining a second cookie through the network interface of the computer; and
  validating the second cookie to authenticate the user for the first sub-location of the network address.

32. The computer readable medium of claim 31, wherein the second cookie is validated upon the computer that is executing the instructions receiving an attempt to access the first sub-location of the network address.

33. The computer readable medium of claim 31, wherein the network address is a domain of the world wide web.

34. The computer readable medium of claim 31, wherein the second cookie is encrypted with a key known to the computer that is executing the instructions.

35. The computer readable medium of claim 31, wherein the second cookie specifies a user identifier and an identifier of the first sub-location of the network address.

36. The computer readable medium of claim 31, wherein the second cookie includes an expiration value.

37. The computer readable medium of claim 31, wherein the instructions when executed by the computer perform the additional steps of:
   obtaining an additional cookie for an additional sub-location of the network address through the network interface; and
   validating the additional cookie to authenticate the user for the additional sub-location of the network address.

38. The computer readable medium of claim 31, wherein the instructions when executed by the computer perform the additional steps of:
   searching through the network interface for an additional cookie that can be validated for an additional sub-location; and
   denying authentication of the user for the additional sub-location of the network address when the additional cookie is not found.

39. The computer readable medium of claim 31, wherein the instructions when executed by the computer perform the additional steps of:
   when the computer receives the first cookie for the first time, then providing the second cookie through the network interface upon validating the first cookie; and
   when the user attempts to access the network location after the first time, then obtaining the second cookie through the network interface.

40. The computer readable medium of claim 31, wherein the sub-location is a server computer of a farm of server computers at a network address of the computer executing the instructions.

* * * * *